(12) United States Patent
Maple et al.

(10) Patent No.: US 6,978,414 B2
(45) Date of Patent: Dec. 20, 2005

(54) METHOD AND APPARATUS FOR PROTECTING AGAINST ERRORS OCCURRING IN DATA STORAGE DEVICE BUFFERS

(75) Inventors: Catharine Anne Maple, Bristol (GB); Jonathan Peter Buckingham, Bristol (GB); Neil Thomas Hutchon, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 442 days.

(21) Appl. No.: 09/905,915

(22) Filed: Jul. 17, 2001

(65) Prior Publication Data

US 2003/0066013 A1 Apr. 3, 2003

(51) Int. Cl.⁷ .............................................. G11C 29/00
(52) U.S. Cl. ...................................................... 714/771
(58) Field of Search ................................ 714/763, 769, 714/771, 702, 755, 758; 360/32, 48

(56) References Cited

U.S. PATENT DOCUMENTS

| | | | |
|---|---|---|---|
| 3,641,534 A | 2/1972 | Irwin ............................. 360/51 |
| 3,893,072 A | 7/1975 | D'Antonio et al. .......... 714/751 |
| 4,001,883 A | 1/1977 | Strout et al. .................... 360/48 |
| 4,390,909 A | 6/1983 | Sakamoto ...................... 360/71 |
| 4,559,568 A | 12/1985 | Watanabe et al. ............. 360/48 |
| 4,604,657 A | 8/1986 | Fukami et al. ................. 360/32 |
| 4,700,240 A | 10/1987 | Umemoto et al. ............. 360/48 |
| 4,829,525 A | 5/1989 | Sugiyama et al. ........... 714/758 |
| 4,835,628 A | 5/1989 | Hinz et al. ..................... 360/48 |
| 4,862,295 A | 8/1989 | Tanaka et al. .................. 360/48 |
| 4,862,443 A | 8/1989 | Tsuji et al. ................ 369/59.25 |
| 5,012,459 A | 4/1991 | Odaka et al. ................... 360/32 |
| 5,293,285 A | 3/1994 | Leonhardt et al. ............. 360/95 |
| 5,339,108 A | 8/1994 | Coleman et al. .......... 375/240.2 |
| 5,353,175 A | 10/1994 | Chiba .......................... 360/51 |
| 5,369,652 A | * 11/1994 | Bailey et al. ................ 714/755 |
| 5,371,745 A | * 12/1994 | Kiyonaga et al. ........... 714/758 |
| 5,384,669 A | 1/1995 | Dunn et al. .................... 360/48 |
| 5,396,374 A | 3/1995 | Kubota et al. ................. 360/27 |
| 5,408,366 A | 4/1995 | Bentley et al. ................ 360/53 |
| 5,416,782 A | 5/1995 | Wells et al. ................. 714/719 |

(Continued)

FOREIGN PATENT DOCUMENTS

| | | |
|---|---|---|
| EP | 0286412 | 10/1988 |
| EP | 0624875 | 11/1994 |
| EP | 0831482 | 3/1998 |
| EP | 0913826 A1 | 5/1999 |
| EP | 0936618 | 8/1999 |
| EP | 0944199 | 9/1999 |
| EP | 0957484 | 11/1999 |
| EP | 0984451 | 3/2000 |
| WO | 97/04454 | 2/1997 |
| WO | 99/50850 | 10/1999 |

OTHER PUBLICATIONS

"Construction of Error Resilient Synchronization Codeword for Variable–Length Code in Image Transmission," Department of Electronics Engineering, by Yew–San et al., 2000, IEEE, pp. 360–363.

"New 8 mm Is Ideal for Automated Storage," J. Gast, *Computer Technology Review* Mar 11, 1991 No. 3, pp. 26, 28–29.

Primary Examiner—Shelly A Chase

(57) ABSTRACT

A linear tape data storage device comprises a read head and a write head; a tape transport mechanism for transporting the linear tape data storage medium across the read head and the write head, the device being operated according to a predefined tape format; a DRAM buffer memory for storing data received during a write or a read operation; and error protection means configured to protect said data from soft errors generated by said buffer memory wherein the protection means comprises means for checking parity generated within the tape format itself. In the preferred embodiment the tape format used is the Linear Tape Open (LTO) format.

36 Claims, 10 Drawing Sheets

U.S. PATENT DOCUMENTS

| | | | |
|---|---|---|---|
| 5,434,719 A | 7/1995 | Miller et al. | 360/53 |
| 5,446,604 A | 8/1995 | Chiba | 360/49 |
| 5,450,250 A | 9/1995 | Garcia et al. | 360/48 |
| 5,465,159 A | 11/1995 | Ohashi | 386/123 |
| 5,467,360 A | 11/1995 | Lokhoff | 714/755 |
| 5,485,321 A | 1/1996 | Leonhardt et al. | 360/48 |
| 5,485,476 A | 1/1996 | Paraujape et al. | 714/798 |
| 5,491,590 A | 2/1996 | Endo et al. | 386/100 |
| 5,543,977 A | 8/1996 | Shih et al. | 360/48 |
| 5,576,903 A | 11/1996 | Brown et al. | 360/48 |
| 5,589,995 A | 12/1996 | Saito et al. | 360/48 |
| 5,633,855 A | 5/1997 | Naito | 369/59.19 |
| 5,675,447 A | 10/1997 | Goleer et al. | 360/48 |
| 5,719,717 A | 2/1998 | Leonhardt et al. | 360/48 |
| 5,729,408 A | 3/1998 | Kikitsu | 360/294.7 |
| 5,731,922 A | 3/1998 | Yamasaki et al. | 360/53 |
| 5,818,654 A | 10/1998 | Reddy et al. | 360/53 |
| 5,844,920 A | 12/1998 | Zook et al. | 714/769 |
| 5,847,890 A | 12/1998 | Hattori | 360/51 |
| 5,905,600 A | 5/1999 | Nieuwkerk | 360/48 |
| 5,940,233 A | 8/1999 | Malone, Sr. | 360/51 |
| 5,969,649 A | 10/1999 | Ashley et al. | 341/59 |
| 5,974,581 A | 10/1999 | Nagai et al. | 714/755 |
| 5,999,110 A | 12/1999 | Blaum et al. | 341/59 |
| 6,018,434 A | 1/2000 | Saliba | 360/77.13 |
| 6,049,654 A | 4/2000 | Furuta et al. | 386/95 |
| 6,092,231 A | 7/2000 | Sze | 714/758 |
| 6,282,040 B1 | 8/2001 | Bartlett | 360/48 |
| 6,288,862 B1 | 9/2001 | Baron et al. | 360/55 |
| 6,367,047 B1 * | 4/2002 | McAuliffe et al. | 714/755 |
| 6,469,854 B1 | 10/2002 | Gill et al. | 360/53 |
| 6,473,561 B1 | 10/2002 | Heo | 386/125 |
| 6,522,831 B2 | 2/2003 | Tanaka et al. | 386/116 |
| 6,532,128 B1 | 3/2003 | Bui et al. | 360/74.1 |
| 6,539,514 B1 | 3/2003 | Bartlett | 714/761 |
| 6,581,184 B1 | 6/2003 | Saeki et al. | 714/800 |
| 6,584,527 B2 | 6/2003 | Verinsky et al. | 710/305 |
| 6,640,326 B1 | 10/2003 | Buckingham et al. | 714/769 |
| 6,650,495 B2 | 11/2003 | Gill et al. | 360/53 |

* cited by examiner

METHOD AND APPARATUS FOR PROTECTING AGAINST ERRORS OCCURRING IN DATA STORAGE DEVICE BUFFERS

FIELD OF THE INVENTION

The present invention relates to data storage devices and particularly, although not exclusively, to a method and apparatus for protecting against soft errors occurring in data storage device Dynamic Random Access Memory (DRAM) buffers.

BACKGROUND TO THE INVENTION

It is known to configure data storage devices to record binary data on magnetic media, this being known as magnetic encoding. A commonly used magnetic medium comprises a magnetic coating on a flexible structure configured for example in the form of a tape. Data is thereafter recorded by the process of magnetic encoding of tracks on the coating in accordance with a particular tape format. The format of information actually recorded on magnetic tape is termed the tape format and allows a suitably configured data storage device to recognize, control and verify the data. Modem tape formats known to those skilled in the art include Linear Tape Open format (LTO) and Digital Data Storage (DDS) format for example and a given data storage device utilizing, for example, LTO format may suitably be termed a Linear Tape Open format data storage device. Such an LTO data storage device having a drive mechanism, and a linear tape data storage medium stored on a removable cartridge, may suitably be configured with a buffer for buffering the data received from a host device prior to storing the received data on the magnetic tape. Similarly, the buffer is used to enable the stored data to be read from tape such as, for example, in cases of backing up a failed computer system. The former operation is known as a data back-up and the latter operation is known as a restore. A data storage buffer of the type discussed may suitably be configured of Dynamic Random Access Memory (DRAM) where the logic state to be entered in each cell is stored as a voltage on the small capacitance associated with a given transistor.

It has been found that data stored in DRAM's may be corrupted resulting in a data error. Two types of DRAM data error are known and may be defined as follows. A hard error is a data error due to a physical defect in the DRAM whereas a soft error may be defined as an error occurring through storage of a particular pattern of data, the pattern for some reason causing one or more bits to flip erroneously from one to zero or vice versa. Although corrupted data occurring through a softer error has been found to be relatively rare it is a serious problem for obvious reasons. Some DRAM's from some manufacturers have been found to cause soft errors of the type discussed above. The problem is particularly serious in data storage devices utilizing DRAM since data obtained from one or more hosts is typically first stored in a DRAM buffer whereafter the data is written onto a magnetic tape for example. The data stored on magnetic tape is therefore expected to be a true back-up of the data obtained from the host, but in fact may comprise corrupted data.

Until manufacturers of DRAM chips create some sort of inbuilt parity check, presumably implemented through automatic creating of parity, storing the parity created and checking the parity when the data is read out, then the problem of soft error corruption in DRAM's must be dealt with in some other way.

The problem is compounded in that frequently memory space is limited in data storage buffers such as DRAM storage devices and therefore methods such as storing data twice on the same DRAM or storing data twice utilising additional DRAM's is unfeasible for many applications. Adding parity or checksums suffers from similar problems.

In view of the above there is therefore clearly a need to provide a method and apparatus for protecting against soft errors in data storage device memory buffers and in particular in DRAM's.

SUMMARY OF THE INVENTION

An object of the present invention is to provide protection against the occurrence of soft errors in the DRAM of a linear data storage device when reading data from a tape and when writing data to tape.

According to a first aspect of the present invention there is provided a data storage device configured to operate in accordance with a predefined tape format, said device comprising:

a transport mechanism for transporting a data storage medium across a write head;

a logical formatter component configurable for receiving said data from a host computer;

an error correction code generation component for generating error correction coding for said received data;

a buffer memory for storing received data processed by said logical formatter;

an encoded data checking component for determining if said encoded data is corrupted; and write head drive and amplifier circuitry for driving said write head and amplifying received non-corrupted data;

said device being characterised in that:

following receipt by said logical formatter component, said error correction code generation component is configured to generate said error correction coding for said data, and prior to said encoded data being stored in said buffer memory; and following encoding of said data said encoded data is stored in said buffer; and following storage of said encoded data in said buffer, said encoded data error correction coding is checked, prior to writing said encoded data to said data storage medium, for soft errors by said encoded data checking component.

According to a second aspect of the present invention there is provided a data storage device configured to operate in accordance with a predefined tape format, said device comprising:

a transport mechanism for transporting a data storage medium comprising error encoded data across a read head;

a read head driver and amplifier circuitry for driving said read head and amplifying said encoded data received from said data storage medium;

a buffer memory for storing said encoded data received from said read head drive and amplifier circuitry;

an error code checking component for checking for error corrupted data; and a logical formatting component for processing correct data received prior to transmitting said data to a host;

said device being characterised in that:

said error code checking component is configured to check if said encoded data transmitted from said buffer to said logical formatting component comprises an error.

According to a third aspect of the present invention there is provided a data storage device comprising:

a read head for reading error correction encoded data from a data storage medium, said error encoding being part of a predefined format for said data storage medium;

a transport mechanism for transporting said data storage medium across said read head;

a buffer memory for storing said encoded data received during a read operation; and error protection means configured to protect said data from errors generated by said buffer memory, said error protection means comprising:

encoded data checking means for checking said error correction encoding for soft errors; and error correction means for correcting for any errors found by said encoded data checking means.

According to a fourth aspect of the present invention there is provided a data storage device comprising:

a write head for writing error correction encoded data to a data storage medium said encoding being part of a predefined format for said data storage medium;

a transport mechanism for transporting said data storage medium across said write head;

a buffer memory for storing said encoded data received during a write operation; and an error protector configured to protect said data from errors generated by said buffer memory, said error protector comprising:

an encoded data checker for checking said error correction encoding for errors; and an error corrector for correcting for any errors found by said first encoded data checker.

According to a fifth aspect of the present invention there is provided in a data storage device a method of writing data transmitted from a host to a data storage medium transported past a write head of said device, said method comprising the steps of:

receiving said data from said host;

encoding said received data wherein said encoding forms a part of a predefined format for said data storage medium;

storing said encoded data in a buffer memory;

following said step of storing said encoded data in said buffer memory checking said encoded data received from said buffer for errors; and if said step of checking for errors determines that no errors are present in said data then writing said encoded data to said data storage medium.

According to a sixth aspect of the present invention there is provided in a data storage device a method of reading error encoded data requested by a host from a data storage medium transported past a read head of said device, said method comprising the steps of:

receiving said requested error encoded data from said data storage medium;

storing said received error encoded data in a buffer memory;

following storage of said error encoded data in said buffer memory checking said error correction coding to determine if said data is corrupted with an error; and if said step of checking for an error determines that no error is present in said encoded data then writing said requested data to said requesting host.

According to a seventh aspect of the present invention there is provided a computer program comprising program instructions for implementing a method of protecting against errors generated during writing of data from a host to a data storage medium of a data storage device, said method comprising the steps of:

receiving said data from said host;

encoding said received data to produce encoded data, wherein said encoded data forms a part of predefined format for said data storage medium;

storing said encoded data in a buffer memory;

following said step of storing said encoded data in said buffer memory checking said encoded data received from said buffer memory for errors; and if said step of checking for errors determines that no errors are present in said data then writing said encoded data to said data storage medium.

According to an eighth aspect of the present invention there is provided a computer program comprising program instructions for implementing a method of correcting for errors during reading of data from a data storage medium by a data storage device in response to a request by a requesting host, said method comprising the steps of:

receiving said requested error encoded data from said tape;

storing said received error encoded data in a buffer memory;

following storage of said error encoded data in said buffer memory checking said error correction coding to determine if said data is corrupted with a soft error; and if said step of checking for errors determines that no errors are present in said data then writing said requested data to said requesting host.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

Figure 1:
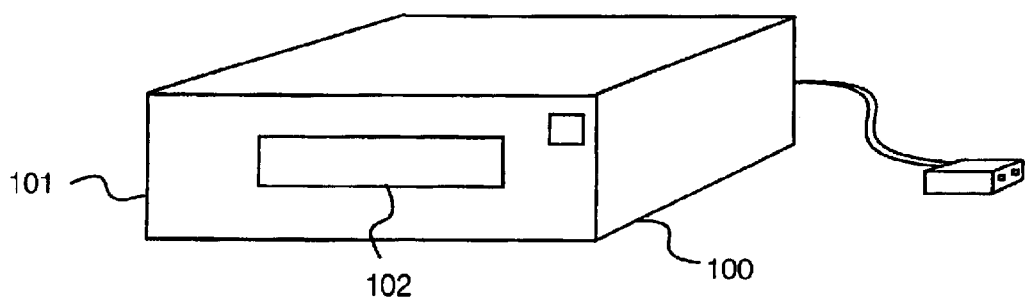
FIG. 1 illustrates schematically, in perspective view, a tape data storage device of a type suitable for utilizing methods and apparatus of the present invention.

Referring to FIG. 1 herein, there is illustrated schematically, in perspective view, a tape data storage device of a type suitable for implementation of the present invention for reading from and writing to a linear tape data storage medium, stored on a cassette cartridge. The tape data storage device comprises a casing 100 having a front facia 101 having slot 102 for accepting a tape cassette cartridge; an internal transport drive mechanism capable of fast forward, fast rewind, search, playback and record modes; a communications interface (logical formatter component) for communicating data in and data out with a host computer device into which the tape data storage device can be installed as a component; and an internal control component, typically implemented as firmware (system software that is held in ROM) stored in a memory device which may be programmable to download software upgrades to control the operation of the tape data storage device. Tape data storage device 100 operates during a read or a write operation according to a tape format such as LTO or DDS. In relation to the present invention the best mode contemplated by the inventors is a tape data storage device 100 operating according to LTO format.

The tape data storage device 100 further comprises DRAM memory used as a buffer prior to storing data on a magnetic tape inserted into device 100. Typically the host computer will run at different speeds and therefore will give bursts of information which is streamlined by the device so that data may be continuously written to the tape at a set rate rather than the tape having to stop and start intermittently.

Figure 2:
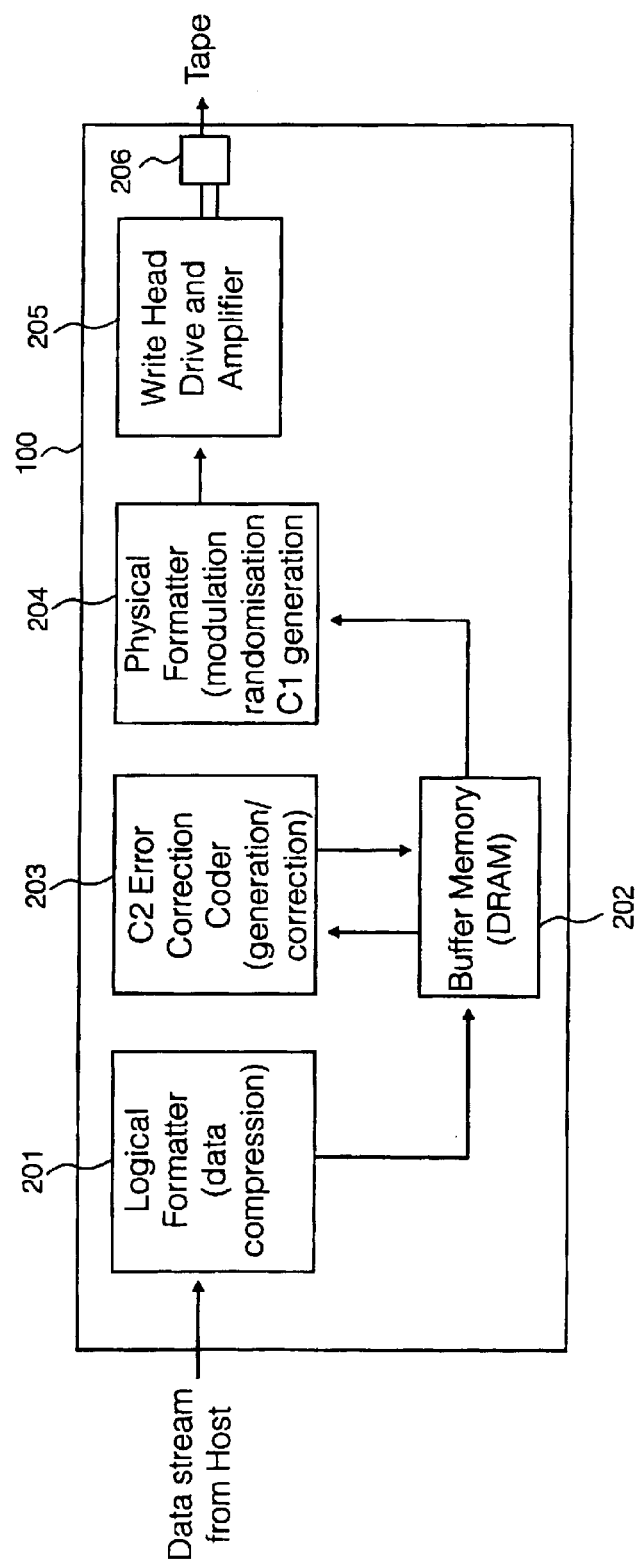
FIG. 2 illustrates schematically components of a prior art write channel of the tape data storage device of FIG. 1.

Referring to FIG. 2 herein, there is illustrated schematically a prior art write channel of the tape data storage device of FIG. 1. A stream of data is received from a host computer by logical formatter 201. The logical formatter determines the format of data to be recorded on a magnetic tape and forms part of the electronic device controller controlling data storage device 100. During a write operation the logical formatter takes bursts of data from the host and performs data compression before storing the data into DRAM buffer memory 202.

Following storage of host data in DRAM 202 control is passed to error correction coder 203 which performs a type of error correction coding known to those skilled in the art as C2 parity generation/data correction. Following processes occurring in component 203 control is passed to a physical formatter component 204 wherein such processes as modulation and randomization are performed, again these being well understood by those skilled in the art. Additionally, component 204 performs a second type of error correction coding on the data known to those skilled in the art as C1. Thus, C1 parity is generated for data currently being processed. Following physical formatting, control is passed to a write head drive and amplifier circuitry 205 configured for effecting writing of data via a magnetic write head 206 to a linear magnetic tape contained in a cartridge cassette.

Figure 3:
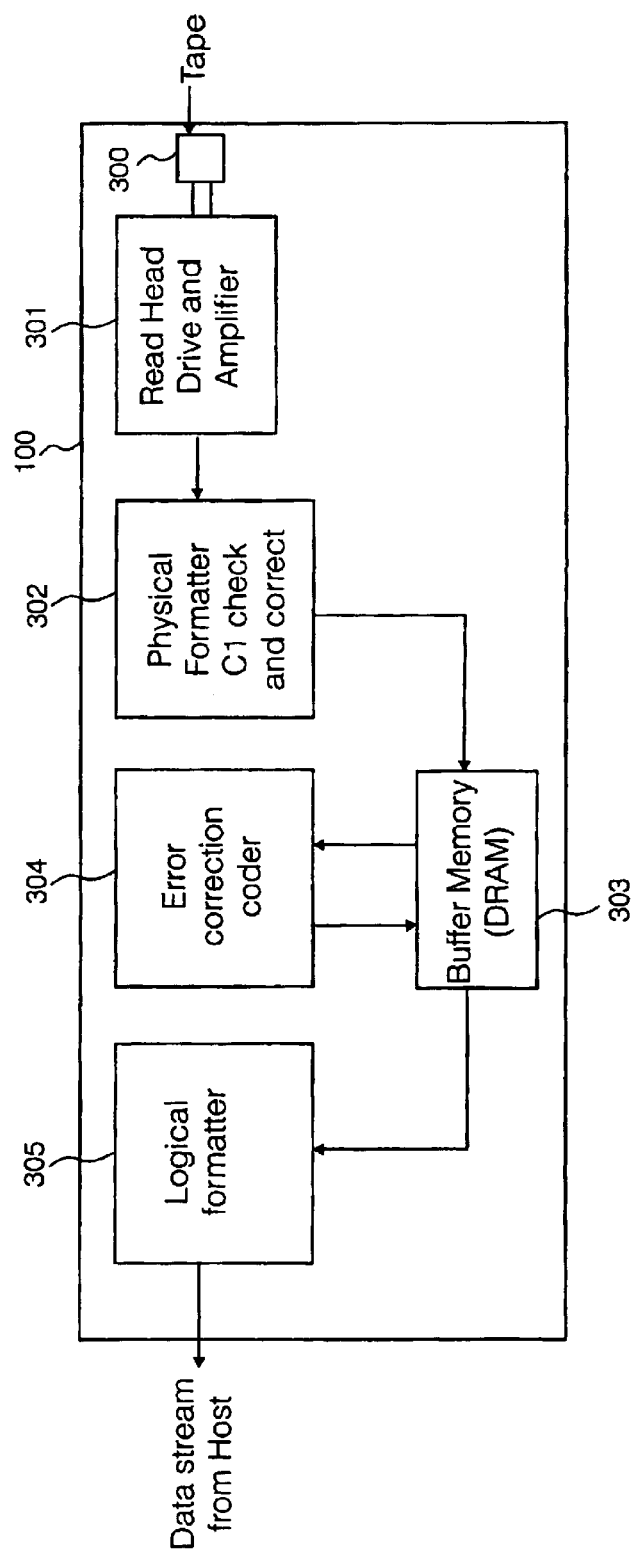
FIG. 3 illustrates schematically components of a prior art read channel of the tape data storage device of FIG. 1.

FIG. 3 illustrates schematically a prior art read channel of a tape data storage device of the type illustrated in FIG. 1. In the process of reading data from back-up tape, that is a restore operation. Data is read from tape via read head 300 operating under the control of read head drive and amplifier circuitry 301. Data read by circuitry 301 is thereafter unformatted by physical formatter 302 wherein C1 parity is also checked and corrected if required. A C1 control block checks the data and corrects it in the physical formatter with subsequent writing of the corrected data into DRAM buffer 303. Following physical formatting the read data is stored in DRAM buffer memory 303 and processed by C2 error correction coder 304. Correction of C2 is undertaken at 304 and again the data is written back into DRAM 303. Following C2 error correction processing and storage in DRAM 303 the data is then forwarded to logical formatter 305 which effectively decompresses the data and thereafter transmits the data up to the host which has requested the data.

In other words, there are two occasions during a reading operation where data is written into DRAM 303 and which therefore gives rise to two possibilities for soft error corruption of data occurring through storage in DRAM 303.

Figure 4:
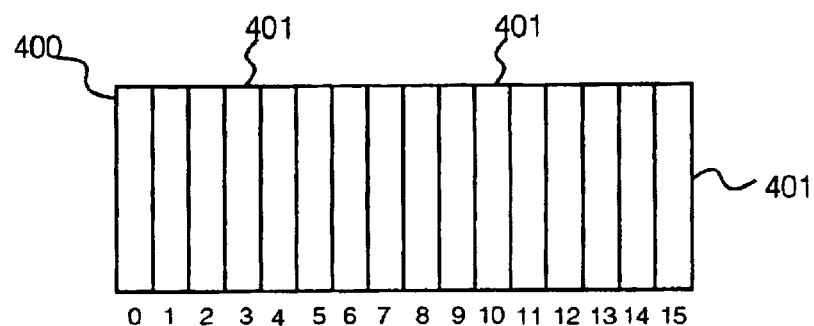
FIG. 4 illustrates schematically a prior art logical layout of a data set comprising a plurality of sub-data sets, the data sets being of a type suitable for storage in a DRAM buffer of the type schematically illustrated in FIGS. 2 and 3.

Referring to FIG. 4 herein, there is illustrated schematically a logical layout of a data set 400 stored on a given tape data storage medium. FIG. 4 may similarly be considered to illustrate schematically a logical layout of a data set 400 stored in the DRAM identified in FIGS. 2 and 3. The data set 400 comprises 492 kilobytes of data, sub-divided into 16 sub-data sets 401. The prior art data set structure illustrated in FIG. 4 is well known to those skilled in the art.

Figure 5:
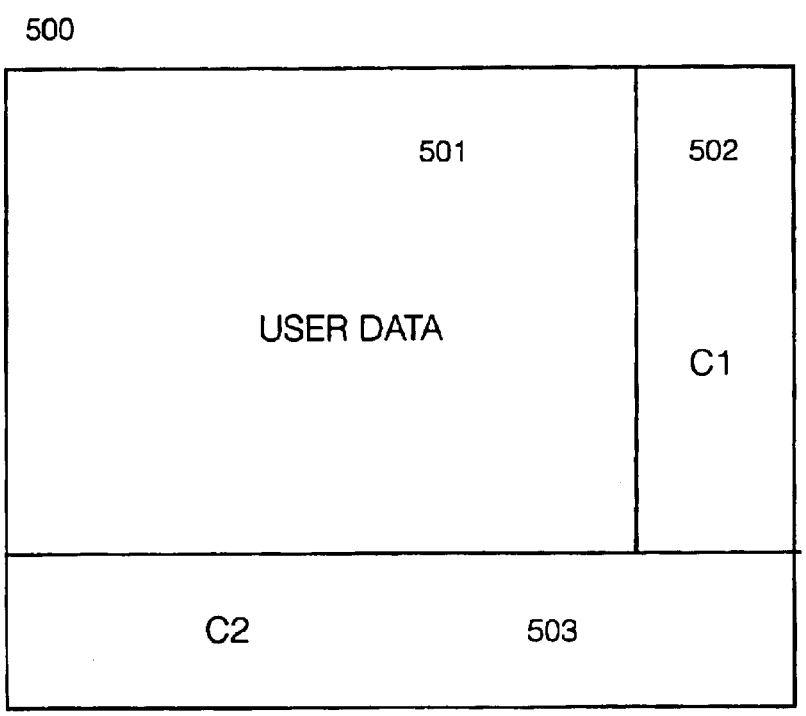
FIG. 5 illustrates schematically a prior art logical layout of a sub-data set of the type identified in FIG. 4.

Referring to FIG. 5 herein, there is illustrated schematically a logical layout of a sub-data set of the type identified in FIG. 4. Each sub-data set 500 comprises a block of user data 501 as well as C1 error correction coding 502 and C2 error correction coding 503. User data 501 in the DRAM comprises rows of code words each of 468 bytes and each associated with C1 parity as shown. C1 and C2 error correction coding or parity is thus computed and stored with the data to provide a check on a group of binary values, the generated sum, a redundant value, being known at the parity bit. It is well known to those skilled in the art that the LTO format requires both types of parity, C1 and C2, to be calculated for given data under consideration. In LTO format there is therefore generated code word pairs which include parity bytes. One code word pair comprises 468 bytes of data plus 12 bytes of parity information. Upon checking a given code word pair error information is thus obtained which enables any required correction to the data to be made.

The inventors have found that soft errors are generated by DRAM when data is actually written into DRAM and are not aware of any occurrence of the problem when data is read back from DRAM. Thus, data corruption through soft errors occurring in DRAM located in linear tape data storage devices occurs during the process of writing the data into the DRAM data memory cells. Referring back to the prior art mechanism of writing data received from a host to a linear tape data storage medium, it is therefore apparent that the data passed to DRAM 202 may be corrupted before C1 and C2 parity generation by error correction coder 203. In other words, the data may actually be corrupted before error correction coding takes place and thus the C1 and C2 parity may inadvertently protect corrupted data rather than the uncorrupted data.

As regards LTO format, it turns out that the order in which C2 and C1 parity is generated is irrelevant. Thus, C1 may be calculated and effected upon the data prior to C2 or vice versa. The inventors have therefore determined that, in contrast to the prior art write architecture of FIG. 2 wherein C2 parity is added after storage of host data in DRAM and C1 parity is generated by the physical formatter following C2 parity generation, soft errors are prevented from reaching tape by configuring C1 parity to be generated following logical formatter processing and before the storage of the host data in DRAM. Furthermore, during a write and in accordance with the present invention, rather than generating C1 parity in the physical formatter after storage of the data in DRAM, it has been determined by the inventors of the present invention that soft error data corruption can now be detected by configuring physical formatter 204 to undertake required C1 parity checking. This is highly preferable since otherwise data corruption (in the prior art device) may occur during writing of data into DRAM whereafter C2 parity is added or corruption could occur following correct writing of data to DRAM, but wherein corruption occurs during the process of writing the C2 parity onto the data. Thus, there are also two points in the prior art device of FIG. 2 at which data corruption can occur during a write.

Figure 6:
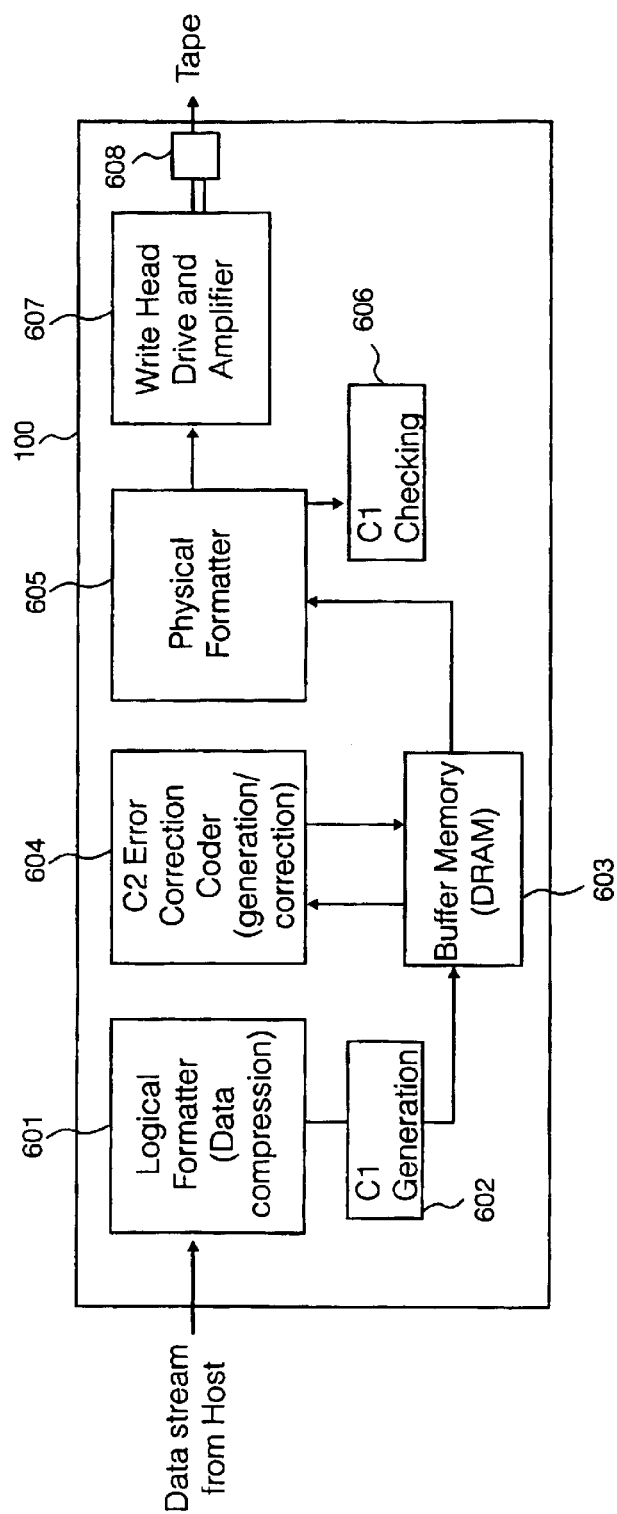
FIG. 6 illustrates schematically, in accordance with the present invention, components of a write channel of a tape data storage device.

FIG. 6 illustrates schematically the components configured in accordance with the present invention to effect a write of host data to a linear tape data storage medium with protection against corruption from soft errors which may be generated by buffer memory 603. Host data is received by logical formatter 601 and thereafter C1 parity generation process is invoked at 602 before storage of the data in DRAM 603. C2 error correction is then performed at 604 whereafter the processed data is passed to physical formatter 605 and checked for soft error corruption via C1 checking by physical formatter C1 checking module 606. Providing C1 checking process 606 determines that no soft errors are present then the processed data is written to write head 608 via write head driver and amplifier module 607. Write head 608, in contact with a linear tape data storage medium such as a magnetic tape, therefore effects writing of the data to a tape inserted in slot 102 of a data storage device 100 as configured in accordance with the present invention. Referring again to FIG. 5, each code word may or may not comprise an error either through writing the host data to DRAM or through the C2 correction applied by C2 error coder 203. As described above, and referring to FIG. 6, the present invention applies C1 correction at 602 and C1 checking at 606. Should the C1 checking function 606 of physical formatter 605 identify one or more errors in stored code words then correction of the one or more corrupted code words is required before data is actually written to tape via write head driver and amplifier 607 and write head 608. C1 correction may be implemented in various ways as will be apparent to those skilled in the arts. For example, if physical formatter 605 is configured to process one code word at a time then each code word could be configured to be stored by the physical formatter such that code word correction may thereafter be applied by the physical formatter. An alternative method which is considered to be the best mode contemplated by the inventors is to return control to effecting operations upon DRAM buffer 603, this being preferable since C2 generation/correction is in any case required to be applied again during such circumstances. Furthermore, such a best mode scheme is readily implemented if the relevant C2 coding block is also capable of undertaking C1 error correction. Since C2 error correction effectively affects all code words in a sub-data set then the minimum unit of data that has to be reprocessed through C2 error correction in order to correct for one or more corrupted code words identified by C1 checking at 606 is a sub-data set of the type illustrated schematically in FIG. 5.

Figure 7:
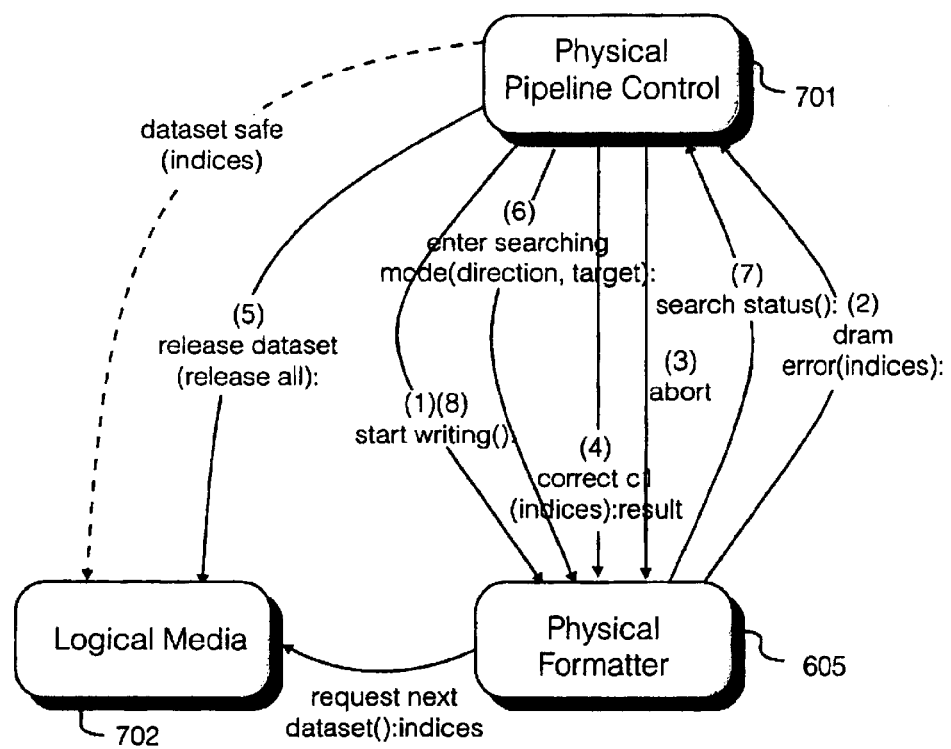
FIG. 7 further illustrates schematically, in accordance with the present invention, processes occurring during writing mode as performed by the components of FIG. 6.

FIG. 7 illustrates schematically processes occurring following initiation of physical formatter 605 to undertake writing of data. Those skilled in the art will recognize FIG. 7 as being in Fusion Syntax wherein: the numbering in brackets indicates the order in which given operations occur, asterisks indicate multiple occurrences of a given operation, parameters (that is portions with brackets) after a given operation name indicate parameters which are sent upon the given operation being invoked and parameters specified after a colon represent the result of the given operation being invoked. Furthermore, square boxes represent hardware, circular boxes represent firmware and round-edged boxes may be considered to represent a module (that is a functional unit comprising both a hardware and a firmware component). Physical formatter 605 is substantially controlled by a central tape data storage device controller and in particular by a suitably configured portion of the device central controller such as that identified at 701 and, for present purposes, given the name "physical pipeline control". Control block 701 is also shown as effecting control over logical media 702 which those that are skilled in the art will realize may be considered to comprise the firmware that surrounds the DRAM. From FIG. 7 the steps involved in activating physical formatter 605 and thereafter undertaking required processing comprise the following steps:

(1) Control block 701 is configured to generate a signal to initiate physical formatter 605 to start writing data;

(2) Physical formatter 605 detects a soft error in a data code word, the error having been generated by DRAM 603 as previously described;

(3) Control block 701 is then configured to instruct physical formatter 605 to abort and thereby prevent any writing to tape in view of corrupted data having been identified. All existing processing actions including writing and checking are aborted;

(4) Control block 701 then instructs physical formatter 605 to effect correction of C1 for the data set in which the error or errors have been identified;

(5) Following step (4), control block 701 is configured to effect release of the given data set by issuing appropriate signaling to firmware 702. The relevant data is effectively reprocessed through re-invoking C1 generation processing 602 and subsequently C2 error correction coding 604;

(6) Following step (5), those skilled in the art will realize that the tape must be repositioned to a desired position so that an append of data can begin by the tape drive writing data along the tape subsequent to the desired end of data position. Such repositioning is the subject of Hewlett Packard's U.S. patent application entitled "Searching for Append Point in Data Storage Device" which is incorporated herein by reference. Following appropriate repositioning of the tape the relevant data sets being reprocessed are rewritten at the correct place on the tape. This indicates the result of physical formatter 605 having identified the relevant data to be rewritten;

(7) Physical formatter 605 is effected by physical pipeline control 701 to start writing/priming again. In the implementation devised by Hewlett Packard, C2 parity is regenerated during this mode.

Those skilled in the art are aware of the relevant processes and methods of control for implementing the above steps and will readily realize structural requirements as regards the finer details pertaining to creation of a fully operable system.

Figure 8:
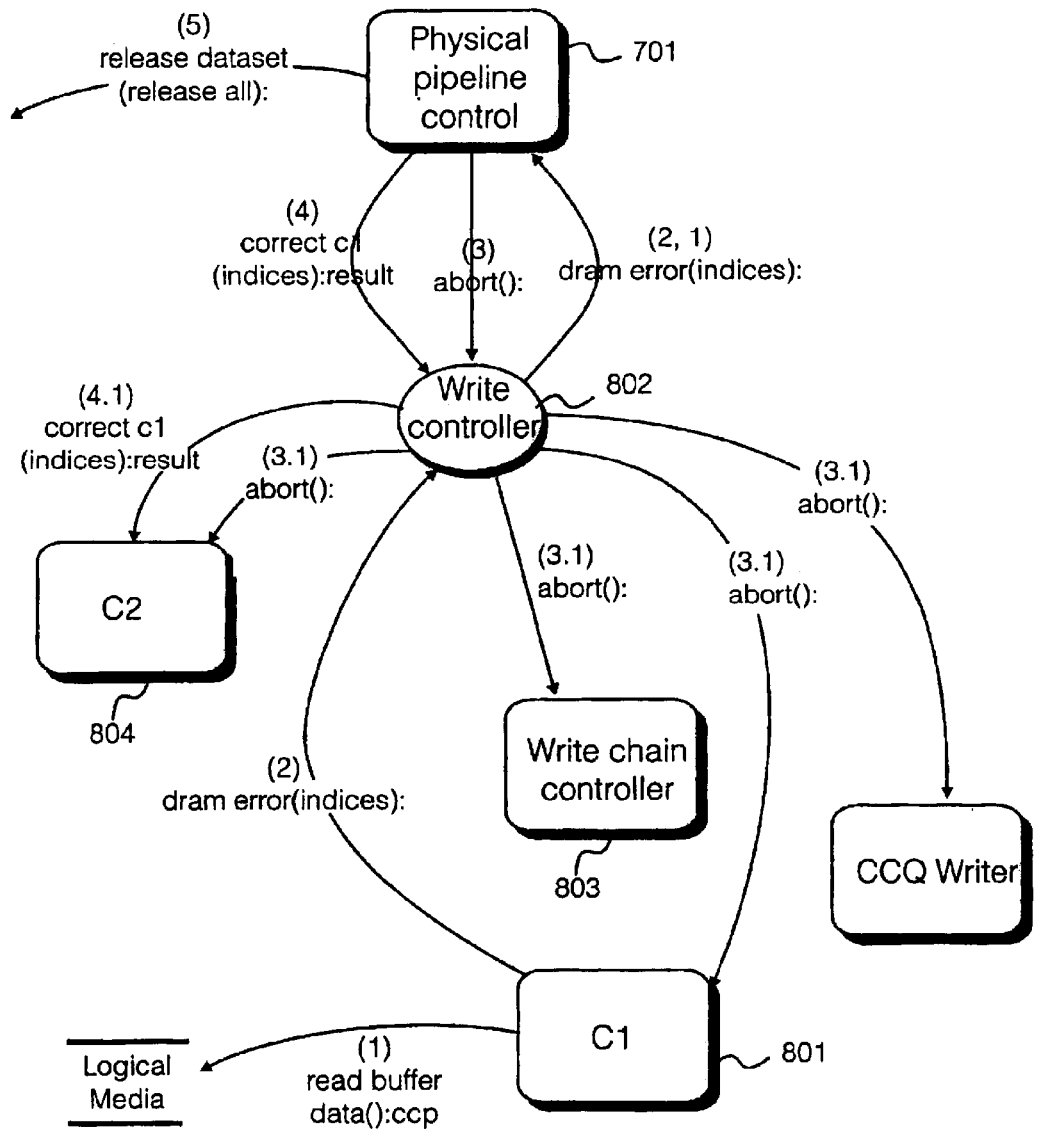
FIG. 8 further illustrates schematically writing operations occurring within the physical formatter identified in FIGS. 6 and 7.

FIG. 8 further illustrates schematically operations performed by physical formatter 605 during writing operations and on determination of a DRAM error. C1 checking is indicated at 801 following reading of data (1) from the DRAM buffer. Upon an error being found, a DRAM error signal (2) is generated and transmitted to write controller 802 and whereafter a further DRAM error signal (2.1) is generated by and transmitted from write controller 802 to physical pipeline control 701. Thereafter, relevant abort signals (3.1) are generated following initial generation of an abort signal (3) by physical pipeline control 701 as signaled to write controller 802. As those skilled in the art will readily appreciate write controller 802 is the area of firmware that controls the write chain in the hardware and this is the reason for generation of an abort signal by write controller 802 to write chain controller 803. FIG. 8 illustrates a particular implementation as implemented by Hewlett Packard and those skilled in the art will realize that the details are not only dependent upon the given tape format used, but also on given hardware and software components actually used—the figure is given as merely one possibility of organizing processing within physical formatter unit 605. Thus, in the figure, at 804, there is indicated C2 error coding with a suitably configured abort signal being generated by write controller 802 and a C1 correction signal (4.1) also being directed to module 804. At step 4.1 (indicated as the C1 correction step) the relevant C1 correction is instructed to be undertaken and it is at this point that control is then directed to repositioning the tape and reconfiguring the physical formatter as appropriate so as to restart writing. In the particular implementation as developed by Hewlett Packard there are therefore steps of identifying a C1 code word error, delaying processing while C1 correction is re-entered, applying C2 correction for the given effected sub-data set and then rewriting the whole data set (not just the particular sub-data set having the error).

With existing prior art architectures reading (restore) operations are typically undertaken by a linear tape data storage device in a response to a request to retrieve data requested by a given host. The prior art method of reading data was described in relation to FIG. 3 earlier on where it was seen that there are two occasions where read data may be corrupted with soft errors due to storage in DRAM buffer memory 303.

Figure 9:
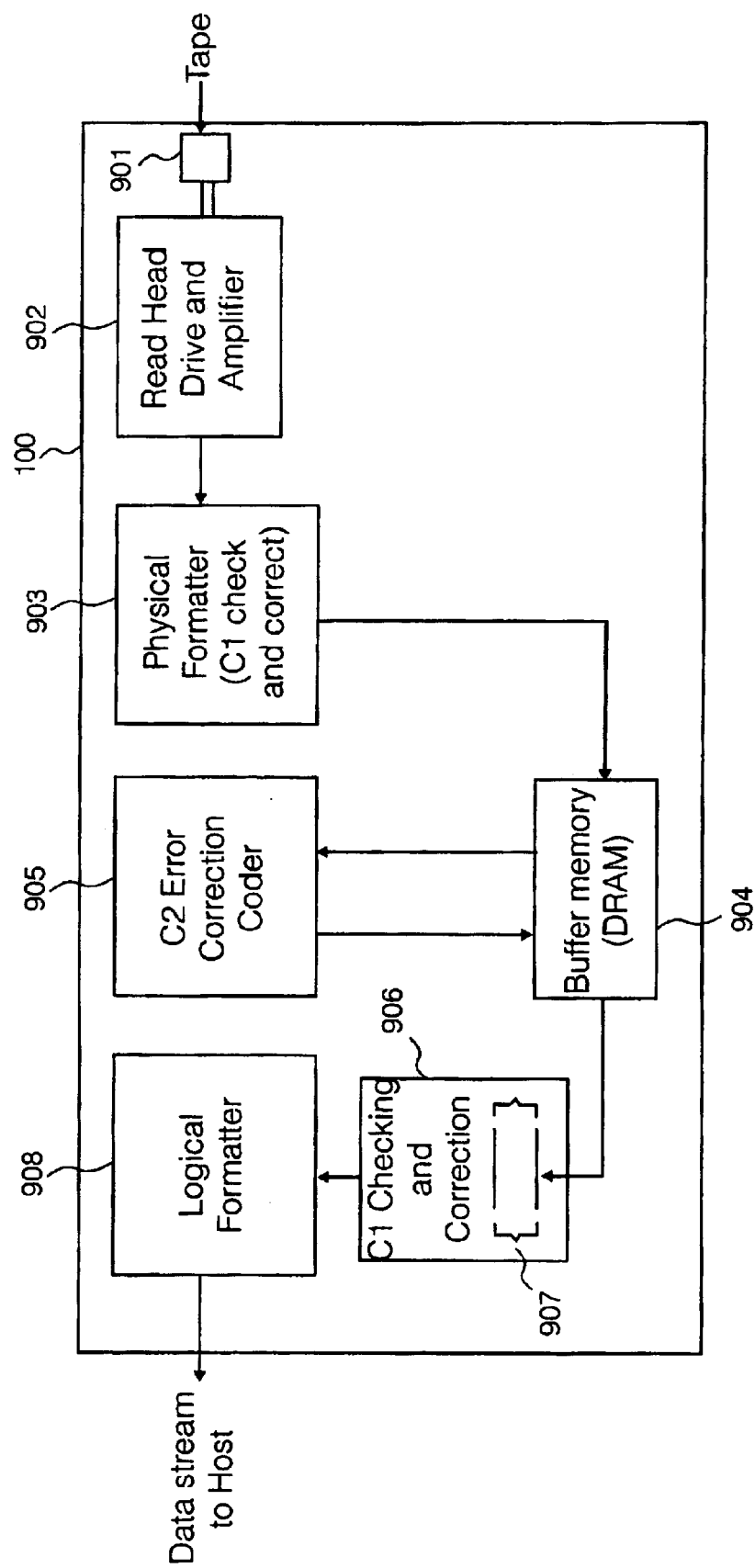
FIG. 9 illustrates schematically, in accordance with the present invention, a read channel of a tape data storage device.

The components of a read channel, as configured in accordance with the present invention, are illustrated schematically in FIG. 9. Data is retrieved from tape during a back-up requested by a given host computer system. The retrieved data is read by read head 901 under control of read head driver and amplifier 902 and is thereafter passed to physical formatter unit 903. In common with the prior art mechanism of FIG. 3 C1 checking and correction may be performed by physical formatter 903 or may be disabled or removed due to redundancy. Following processing by physical formatter 903 the data is passed to DRAM buffer memory 904 and processed according to C2 error correction coding 905. After data has been written to DRAM buffer memory as described the processed data is further processed in accordance with the present invention by C1 checking and correction module 906. The present invention thus provides an extra processing block 906 (as compared with the known prior art scheme of FIG. 3) configured to process data received from DRAM buffer memory 904. To implement C1 checking and correction following storage in DRAM buffer 904 the C1 checking and correction module 906 is provided with a suitably configured memory such as, for example, a FIFO type memory or cache device. FIFO 907 is configured to take a whole C1 code word pair (CCP) out of the DRAM at a time and store it so that C1 checking and correction can check the C1 parity bytes on the end of a given row of the type illustrated schematically in FIG. 5. If the relevant parity byte is correct then the data is passed straight through to logical formatter module 908 and thereafter passed to the host which actually requested the back-up data to be provided. If an error is found in the given CCP then C1 checking and correction module 906 is configured to correct the data within the FIFO and to then send the data on. Such checking and correcting is readily implemented substantially in real time as will be apparent to those skilled in the art. Those skilled in the art will also realize that this means that control does not have to be returned back to the DRAM (in contrast to write operations described earlier) because during checking by module 906 C2 correction has already been undertaken by C2 error correction coder 905.

Figure 10:
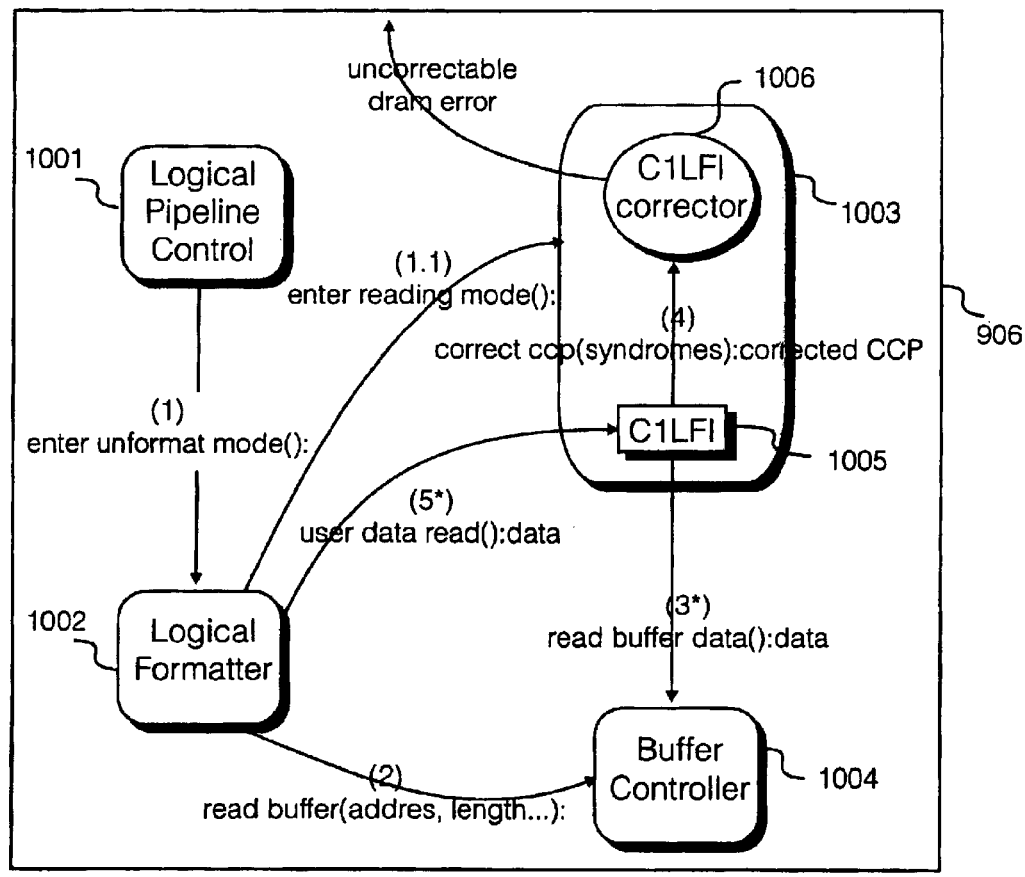
FIG. 10 further illustrates schematically processes occurring during the reading mode as performed by the components detailed in FIG. 9.

FIG. 10 further illustrates schematically, in accordance with the present invention, processes occurring during the reading mode detailed in FIG. 9. In common with FIGS. 7 and 8, this figure also utilizes Fusion Syntax to illustrate operations between modules during a restore when a DRAM error occurs. FIG. 10 further substantially details the operations occurring in relation to control block module 906 of FIG. 9. The linear tape data storage device controller effectively passes control to control entity 1001, labeled "logical pipeline control". Entity 1001 thereafter causes the device to enter into "unformat mode", otherwise known as "reading off tape mode". Similarly, the C1 block schematically illustrated at 1003 is also effectively put into reading mode. In the applicants original implementation the term "C1 LFI" is used to mean C1 logical formatter interface since in the actual implementation it referred to the C1 block 602 and the new checking and correction block 906 of FIGS. 6 and 9 respectively. Thus, block 1003 in FIG. 10 includes both blocks 602 and 906 and therefore includes a C1 generator and a C1 checker. However, combining both functions in this way is not necessary and therefore in the applicants actual implementation only one half actually gets used when writing and similarly only one half gets used when a reading operation is being performed. Those skilled in the art will thus realize that usage of the term "C1 logical formatter interface" may more properly be termed "C1 generation and checking". Following C1 correction logical formatter 1002 is configured to inform the buffer controller 1004 that data may now be sent and thus those skilled in the art will realize that sending data out of the DRAM buffer is effectively controlled by the logical formatter firmware 1002. However, as seen above, the data sent from DRAM is not passed directly to the logical formatter, but is actually passed into a new C1 coding block 1003 prior to passage to the logical formatter itself. C1 coding block 1003 comprises a queuing mechanism 1005 whereafter correction is applied by module 1006, both forming part of module 1003. As can be seen at step (4) in the figure, the read data is effectively stored in an internal cache (or FIFO) within the C1 block and then corrected ("correct CCP"). Thus, C1 block 1003 effectively stores up all the data bytes and checks the parity bytes to see if any code word pairs have been corrupted. If an error is found then a suitably configured interrupt may be invoked so as to interrupt operation and this is generally indicated towards the top of the figure as the signal "uncorrectable DRAM error". This indicates that if the error is substantial the correction cannot be effected and therefore a signal is sent to a higher level in the device controller resulting in the device controller aborting all processes. In other words, the device controller issues a signal effecting repositioning of the tape and causing a re-read to be performed. Referring back to block 1003 it is thus seen that data comes out of buffer controller 1004 and is passed into block 1003. From the Fusion Syntax it is further seen that the correct CCP operation goes into firmware and this is merely an arbitrary choice as to architecture as those skilled in the art will realize. In the implementation configured by Hewlett Packard the actual correction is performed by firmware, but equally could have been done in hardware for example. Following data correction the data is then taken out of block 1003 and passed to processing by logical formatter 1002 as is indicated by operation number 5.

The implementation actually built by Hewlett Packard may be summarized as follows. During back-up (write—FIG. 6): C1 protection is generated on the code word between the logical formatter 601 and the data being written into the buffer 603. After C2 is generated C1 is then checked as the data is written out to the write channels. If an error occurs the C2 function can be used to perform C1 correction and then C2 generation in the buffer. The data is then read out of the buffer and checked by C1 again. During restore (read—FIG. 9): C1 is corrected on the way from the channels to the buffer. C2 is corrected as normal. As the data leaves the buffer C1 is checked. If an error occurs it will be corrected by firmware 906 and an intermediate cache 907.

Figure 11:
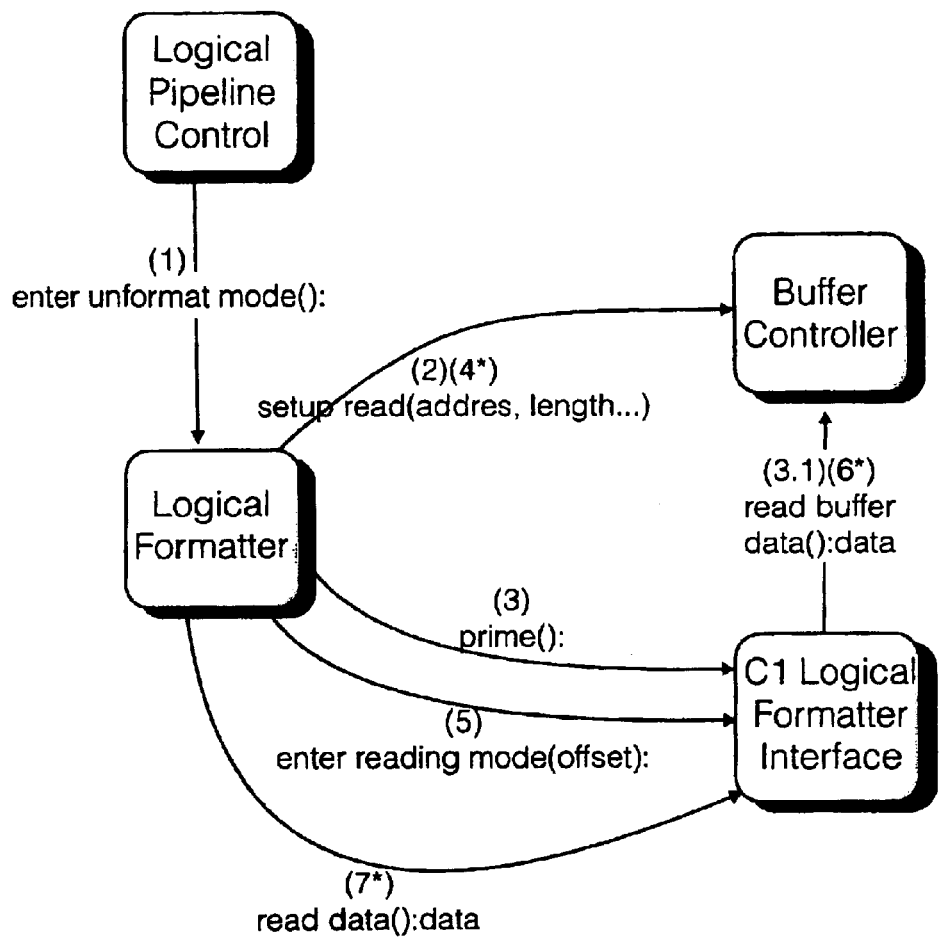
FIG. 11 illustrates schematically, in accordance with the present invention, further processes involved when reading from a particular point in the data that is not a data set boundary point.

For purposes of giving a more or less complete account of processing undertaken by a device controller configured in accordance with the present invention, FIG. 11 illustrates schematically further processes involved when reading data from a particular point in the data that is not a data set boundary point. Again, as with FIGS. 7, 8 and 10 Fusion Syntax is used. If a read operation or a write operation is required to be undertaken from a particular point in the DRAM buffer then the invention is required to ensure that C1 protection is provided on the data. Thus, for example, if data is being read then it must be verified that the entire CCP is correct before reading can be effected from somewhere within the boundaries of a CCP. In other words, a suitably configured protection device must clearly be configured to ensure that an entire CCP is read, thus ensuring it is correct. FIG. 11 is provided merely to indicate that certain such corner cases must be taken account of in any device actually implemented with protection of the type constituting the present invention.

The apparatus and methods of the present invention may be implemented as appropriate in a combination of hardware, firmware and software. The invention may be implemented as software and thus the invention comprises a computer program stored on a record medium, a computer program stored in a computer memory, a computer program stored in a read only memory and a computer program carried on an electrical carrier signal.

What is claimed is:

1. A data storage device configured to operate in accordance with a predefined tape format, said device comprising:
    a transport mechanism for transporting a data storage medium across a write head;
    a logical formatter component configurable for receiving said data from a host computer;
    an error correction code generation component for generating error correction coding for said received data;
    a buffer memory for storing received data processed by said logical formatter;
    an encoded data checking component for determining if said encoded data is corrupted; and
    write head drive and amplifier circuitry for driving said write head and amplifying received non-corrupted data,
    said device being arranged so that:
    (a) following receipt of said data by said logical formatter component and prior to said encoded data being stored in said buffer memory, said error correction code generation component generates said error correction coding for said data;
    (b) following encoding of said data, said encoded data is stored in said buffer; and
    (c) following storage of said encoded data in said buffer and prior to writing said encoded data to said data storage medium, said encoded data error correction coding is checked for soft errors by said encoded data checking component.

2. A data storage device as claimed in claim 1, wherein said buffer memory comprises Dynamic Random Access Memory (DRAM).

3. A data storage device as claimed in claim 1, further comprising an error correction component for correcting corrupted data found by said data checking component.

4. A data storage device as claimed in claim 1, further comprising an error correction component for correcting corrupted data found by said data checking component, said error correction component being configured to effect rewriting of an amount of said host derived data, previously found to have comprised an error, to said buffer.

5. A data storage device as claimed in claim 1, further comprising an error correction component for correcting corrupted data found by said data checking component, said error correction component being configured to rewrite, from said host, an entire corresponding data set to said buffer.

6. A data storage device as claimed in claim 1, wherein said tape format comprises Linear Tape Open (LTO) Format.

7. A data storage device as claimed in claim 1, wherein said tape format comprises LTO format and said error correction encoding comprises C1 encoding.

8. A data storage device as claimed in claim 1, wherein said device further comprises means for generating and checking a second (C2) error correction code.

9. A data storage device configured to operate in accordance with a predefined tape format, said device comprising:
    a transport mechanism for transporting a data storage medium across a read head, the data storage medium including encoded data susceptible to having errors when read by the head;
    a read head driver and amplifier circuitry for driving said read head and amplifying said encoded data received from said data storage medium;
    a buffer memory for storing encoded data received from said read head drive and amplifier circuitry;
    an error code checking component for checking for error corrupted data;
    a logical formatting component for processing correct data received prior to transmitting said data to a host, said device being arranged so that said error code checking component determines if said encoded data transmitted from said buffer to said logical formatting component includes an error; and
    an error correction component for correcting corrupted data found by said data checking component, said error correction component being configured to effect re-writing of an amount of said data derived from said data storage medium, previously found to have comprised an error, to said buffer.

10. A data storage device as claimed in claim 9, wherein said buffer memory comprises Dynamic Random Access Memory (DRAM).

11. A data storage device as claimed in claim 9, further comprising an error correction component for correcting corrupted data found by said checking component.

12. A data storage device as claimed in claim 9, wherein said device further comprises means for generating and checking a second (C2) error correction code of said encoded data.

13. A data storage device configured to operate in accordance with a predefined tape format, said device comprising:
 a transport mechanism for transporting a data storage medium across a read head, the data storage medium including encoded data susceptible to having errors when read by the head;
 a read head driver and amplifier circuitry for driving said read head and amplifying said encoded data received from said data storage medium;
 a buffer memory for storing encoded data received from said read head drive and amplifier circuitry;
 an error code checking component for checking for error corrupted data;
 a logical formatting component for processing correct data received prior to transmitting said data to a host, said device being arranged so that said error code checking component determines if said encoded data transmitted from said buffer to said logical formatting component includes an error; and
 an error correction component for correcting corrupted data found by said data checking component, said error correction component being configured to re-read, from said data storage medium, an entire corresponding data set for writing to said buffer.

14. A data storage device configured to operate in accordance with a predefined tape format, said device comprising:
 a transport mechanism for transporting a data storage medium across a read head, the data storage medium including encoded data susceptible to having errors when read by the head;
 a read head driver and amplifier circuitry for driving said read head and amplifying said encoded data received from said data storage medium;
 a buffer memory for storing encoded data received from said read head drive and amplifier circuitry;
 an error code checking component for checking for error corrupted data;
 a logical formatting component for processing correct data received prior to transmitting said data to a host, said device being arranged so that said error code checking component determines if said encoded data transmitted from said buffer to said logical formatting component includes an error; and
 an error correction component for correcting corrupted data found by said data checking comp, said error correction component comprising a dedicated memory structure.

15. A data storage device configured to operate in accordance with a predefined tape format, said device comprising:
 a transport mechanism for transporting a data storage medium across a read head, the data storage medium including encoded data susceptible to having errors when read by the head;
 a read head driver and amplifier circuitry for driving said read head and amplifying said encoded data received from said data storage medium;
 a buffer memory for storing encoded data received from said read head drive and amplifier circuitry;
 an error code checking component for checking for error corrupted data;
 a logical formatting component for processing correct data received prior to transmitting said data to a host, said device being arranged so that said error code checking component determines if said encoded data transmitted from said buffer to said logical formatting component includes an error; and
 an error correction component for correcting corrupted data found by said data checking component, said error correction component comprising a dedicated memory in the form of a first-in, first-out device.

16. A data storage device configured to operate in accordance with a predefined tape format, said device comprising:
 a transport mechanism for transporting a data storage medium across a read head, the data storage medium including encoded data susceptible to having errors when read by the head;
 a read head driver and amplifier circuitry for driving said read head and amplifying said encoded data received from said data storage medium;
 a buffer memory for storing encoded data received from said read head drive and amplifier circuitry;
 an error code checking component for checking for error corrupted data;
 a logical formatting component for processing correct data received prior to transmitting said data to a host, said device being arranged so that said error code checking component determines if said encoded data transmitted from said buffer to said logical formatting component includes an error; and
 an error correction component for correcting corrupted data found by said data checking component, said error correction component being configured to effect re-writing of the portion of said data storage medium derived data previously found to have been corrupted to said buffer and thereafter to pass said re-read data to said checking component prior to transmission to said logical format component.

17. A data storage device configured to operate in accordance with a Linear Tape Open (LTO) format, said device comprising:
 a transport mechanism for transporting a data storage medium across a read head, the data storage medium including encoded data susceptible to having errors when read by the head;
 a read head driver and amplifier circuitry for driving said read head and amplifying said encoded data received from said data storage medium;
 a buffer memory for storing encoded data received from said read head drive and amplifier circuitry;
 an error code checking component for checking for error corrupted data;
 a logical formatting component for processing correct data received prior to transmitting said data to a host, said device being arranged so that said error code checking component determines if said encoded data transmitted from said buffer to said logical formatting component includes an error.

18. A data storage device configured to operate in accordance with a predefined tape format, said device comprising:
 a transport mechanism for transporting a data storage medium across a read head, the data storage medium including encoded data susceptible to having errors when read by the head;

a read head driver and amplifier circuitry for driving said read head and amplifying said encoded data received from said data storage medium;

a buffer memory for storing encoded data received from said read head drive and amplifier circuitry;

an error code checking component for checking for error corrupted data; and a logical formatting component for processing correct data received prior to transmitting said data to a host, said device being arranged so that said error code checking component determines if said encoded data transmitted from said buffer to said logical formatting component includes an error, wherein said format comprises Linear Tape Open (LTO) format, and said error correction encoded data comprises C1 encoding.

19. A data storage device comprising:

a read head for reading error correction encoded data from a data storage medium, said error correction encoded data being part of a predefined format for said data storage medium;

a transport mechanism for transporting said data storage medium across said read head;

a buffer memory for storing said encoded data received during a read operation; and error protection means configured to protect said data from errors generated by said buffer memory, said error protection means comprising:

(a) encoded data checking means for checking said error correction encoding for soft errors; and (b) error correction means for correcting for any errors found by said encoded data checking means.

20. A data storage device, comprising:

a write head for writing error correction encoded data to a data storage medium said error correction encoded data being part of a predefined format for said data storage medium;

a transport mechanism for transporting said data storage medium across said write head;

a buffer memory for storing said encoded data received during a write operation; and an error protector configured to protect said data from errors generated by said buffer memory, said error protector comprising:

(a) an encoded data checker for checking said error correction encoding for errors; and (b) an error corrector for correcting for any errors found by said encoded data checker.

21. In a data storage device, a method of writing data transmitted from a host to a data storage medium transported past a write head of said device, said method comprising the steps of:

receiving said data from said host;

encoding said received data wherein said encoding forms a part of a predefined format for said data storage medium;

storing said encoded data in a buffer memory;

following said step of storing said encoded data in said buffer memory checking said encoded data received from said buffer for errors; and if said step of checking for errors determines that no errors are present in said data then writing said encoded data to said data storage medium.

22. The method as claimed in claim 21, wherein said encoding comprises C1 encoding according to a linear tape open (LTO) format.

23. The method as claimed in claim 21, further comprising the step of correcting corrupted data if said step of checking said encoded data determines that an amount of said encoded data has been corrupted.

24. The method as claimed in claim 21, wherein if said step of checking said encoded data for errors determines that an error is present, then an amount of data previously found to have comprised said error is rewritten from said host into said buffer.

25. The method as claimed in claim 21, wherein said encoded data stored in said buffer is encoded according to a second encoding scheme prior to transmission from said buffer to said data storage medium.

26. In a data storage device, a method of reading error encoded data that is C1 encoded according to a linear tape open (LTO) format, the data being requested by a host from a data storage medium transported past a read head of said device, said method comprising the steps of:

receiving said requested error encoded data from said data storage medium;

storing said received error encoded data in a buffer memory;

following storage of said error encoded data in said buffer memory checking said error correction coding to determine if said data is corrupted with an error; and if said step of checking for an error determines that no error is present in said encoded data then writing said requested data to said requesting host.

27. The method as claimed in claim 26, further comprising the step of correcting corrupted data if said step of checking said encoded data determines that an amount of said encoded data has been corrupted.

28. In a data storage device, a method of reading error encoded data requested by a host from a data storage medium transported past a read head of said device, said method comprising the steps of:

receiving said requested error encoded data from said data storage medium;

storing said received error encoded data in a buffer memory;

following storage of said error encoded data in said buffer memory checking said error correction coding to determine if said data is corrupted with an error; and if said step of checking for an error determines that no error is present in said encoded data then writing said requested data to said requesting host, wherein if said step of checking said encoded data for an error determines that an error is present, then an amount of data previously found to have comprised said error is rewritten from said data storage medium into said buffer.

29. A computer program product comprising program instructions for implementing a method of protecting against errors generated during writing of data from a host to a data storage medium of a data storage device, said method comprising the steps of:

receiving said data from said host;

encoding said received d to produce encoded data, wherein said encoded data forms a part of predefined format for said data storage medium;

storing said encoded data in a buffer memory;

following said step of storing said encoded data in said buffer memory checking said encoded data received from said buffer memory for errors; and if said step of checking for errors determines that no errors are present in said data then writing said encoded data to said data storage medium.

30. The computer program product as claimed in claim 29, further comprising the step of correcting corrupted data if said step of checking said encoded data determines that an amount of said encoded data has been corrupted.

31. A computer program product comprising program instructions for implementing a method of correcting for errors during reading of data from a data storage medium by a data storage device in response to a request by a requesting host, said data being C1 encoded according to a linear tape open (LTO) format, said method comprising the steps of:
- receiving said requested error encoded data from said tape;
- storing said received error encoded data in a buffer memory;
- following storage of said error encoded data in said buffer memory checking said error correction coding to determine if said data is corrupted with a soft error; and
- if said step of checking for errors determines that no errors are present in said data then writing said requested data to said requesting host.

32. A computer program product according to claim 31, wherein said method comprises the additional step of correcting corrupted data if said step of checking said encoded data determines that an amount of said encoded data has been corrupted.

33. A computer program product comprising program instructions for implementing a method of correcting for errors during reading of data from a data storage medium by a data storage device in response to a request by a requesting host, said data being C1 encoded according to a linear tape open (LTO) format, said method comprising the steps of:
- receiving said requested error encoded data from said tape;
- storing said received error encoded data in a buffer memory;
- following storage of said error encoded data in said buffer memory checking said error correction coding to determine if said data is corrupted with a soft error; and
- if said step of checking for errors determines that no errors are present in said data then writing said requested data to said requesting host.

34. A computer program product comprising program instructions for implementing a method of protecting against errors generated during writing of data from a host to a data storage medium of a data storage device, said method comprising the steps of:
- receiving said data from said host;
- encoding said received d to produce encoded data, wherein said encoded data forms a part of predefined format for said data storage medium;
- storing said encoded data in a buffer memory;
- following said step of storing said encoded data in said buffer memory checking said encoded data received from buffer memory for errors;
- if said step of checking for errors determines that no errors are present in said data then writing said encoded data to said data storage medium; and
- if said step of checking said encoded data for an error determines that an error is present, then an amount of data previously found to have comprised said error is rewritten from said data storage into said buffer.

35. A computer program product comprising program instructions for implementing a method of correcting for errors during reading of data from a data storage medium by a data storage device in response to a request by a requesting host, said method comprising the steps of:
- receiving said requested error encoded data from said tape;
- storing said received error encoded data in a buffer memory;
- following storage of said error encoded data in said buffer memory checking said error correction coding to determine if said data is corrupted with a soft error;
- if said step of checking for errors determines that no errors are present in said data then writing said requested data to said requesting host; and
- if said step of checking said encoded data for an error determines that an error is present, then an amount of data previously found to have comprised said error is rewritten from said data storage into said buffer.

36. A data storage device configured to operate in accordance with a predefined tape format, said device comprising:
- a transport mechanism for transporting a data storage medium across a read head, the data storage medium including encoded data susceptible to having errors when read by the head;
- a read head driver and amplifier circuitry for driving said read head and amplifying said encoded data received from said data storage medium;
- a memory for storing encoded data received from said read head drive and amplifier circuitry;
- a processor arrangement for:
  (a) checking for error corrupted data;
  (b) processing correct data received prior to transmitting said data to a host; and
  (c) determining if said encoded data transmitted from said buffer to said logical formatting component includes an error;
- following storage of said error encoded data in said buffer memory checking said error correction coding to determine if said data is corrupted with an error; and
- if said step of checking for an error determines that no error is present in said encoded data then writing said requested data to said requesting host.

* * * * *